US008811699B2

(12) United States Patent
Lu et al.

(10) Patent No.: US 8,811,699 B2
(45) Date of Patent: Aug. 19, 2014

(54) DETECTION OF LANDMARKS AND KEY-FRAMES IN CARDIAC PERFUSION MRI USING A JOINT SPATIAL-TEMPORAL CONTEXT MODEL

(75) Inventors: Xiaoguang Lu, West Windsor, NJ (US); Jens Gühring, Erlangen (DE); Hui Xue, Franklin Park, NJ (US); Marie-Pierre Jolly, Hillsborough, NJ (US); Christoph Guetter, Lawrenceville, NJ (US); Bogdan Georgescu, Plainsboro, NJ (US); Sven Zuehlsdorff, Chicago, IL (US); Arne Littmann, Erlangen (DE)

(73) Assignees: Siemens Aktiengesellschaft, Munich (DE); Siemens Medical Solutions USA, Inc., Malvern, PA (US)

( * ) Notice: Subject to any disclaimer, the term of this patent is extended or adjusted under 35 U.S.C. 154(b) by 223 days.

(21) Appl. No.: 13/234,694

(22) Filed: Sep. 16, 2011

(65) Prior Publication Data
US 2012/0177269 A1 Jul. 12, 2012

Related U.S. Application Data

(60) Provisional application No. 61/385,180, filed on Sep. 22, 2010.

(51) Int. Cl.
*G06K 9/00* (2006.01)
(52) U.S. Cl.
USPC ........... 382/128; 382/129; 382/130; 382/131; 382/132
(58) Field of Classification Search
None
See application file for complete search history.

(56) References Cited

U.S. PATENT DOCUMENTS

| | | | |
|---|---|---|---|
| 6,556,199 B1 * | 4/2003 | Fang et al. | 345/424 |
| 6,717,576 B1 * | 4/2004 | Duluk et al. | 345/419 |
| 7,755,623 B2 * | 7/2010 | Rockwood et al. | 345/420 |
| 8,218,839 B2 * | 7/2012 | Sun et al. | 382/128 |
| 2003/0086596 A1 * | 5/2003 | Hipp et al. | 382/128 |
| 2005/0281447 A1 * | 12/2005 | Moreau-Gobard et al. | 382/130 |
| 2006/0202989 A1 * | 9/2006 | Yinghui | 345/424 |
| 2006/0269111 A1 * | 11/2006 | Stoecker et al. | 382/128 |
| 2006/0290695 A1 * | 12/2006 | Salomie | 345/420 |
| 2007/0253609 A1 * | 11/2007 | Aben | 382/128 |
| 2008/0240526 A1 * | 10/2008 | Suri et al. | 382/128 |
| 2008/0260221 A1 * | 10/2008 | Unal et al. | 382/128 |
| 2009/0154785 A1 * | 6/2009 | Lynch et al. | 382/131 |
| 2010/0240996 A1 * | 9/2010 | Ionasec et al. | 600/443 |
| 2010/0278405 A1 * | 11/2010 | Kakadiaris et al. | 382/131 |
| 2011/0188715 A1 * | 8/2011 | Shotton et al. | 382/128 |
| 2011/0228997 A1 * | 9/2011 | Sharp et al. | 382/131 |

OTHER PUBLICATIONS

Ortiz et al ("Automated 3-D Enchocardiography Analysis compared with manual delineations of SPECT MUGA", 2002).*

(Continued)

*Primary Examiner* — Jason M Repko
*Assistant Examiner* — Avinash J Yentrapati

(57) ABSTRACT

A method including receiving an image sequence, wherein the image sequence includes a plurality of two-dimensional (2D) image frames of an organ arranged in a time sequence; constructing a three-dimensional (3D) volume by stacking a plurality of the 2D image frames in time order; detecting a best bounding box for a target of interest in the 3D volume, wherein the best bounding box is specified by a plurality of parameters including spatial and temporal information contained in the 3D volume; and determining the target of interest from the best bounding box.

20 Claims, 23 Drawing Sheets

(56) References Cited

OTHER PUBLICATIONS

Xue et al ("Unsupervised Inline analysis of cardiac perfusion MRI", 2009).*

Jerosch-Herold, M., Muehling, O., and Wilke, N., "MRI of myocardial perfusion," Seminars in Ultrasound, CT, and MRI 27(1), 2-10 (2006).

Gerber, B., Raman, S., Nayak, K., Epstein F., Ferreira, P., Axel, L., and Kraitchman, D., "Myocardial first-pass perfusion cardiovascular magnetic resonance: history, theory, and current state of the art," Journal of Cardiovascular Magnetic Resonance 10, 1-18 (2008).

Cerqueira, M., Weissman, N., Dilsizian, V., Jacobs, A., Kaul, S., Laskey, W . Pennel, D . Rumberger, J., Ryan, T., and Verani, M., "Standardized myocardal segmenation and nomenclature for tomographic imaging of the heart," Circulation, 105-539 (2002).

Xue, H., Zuchlsdorff, S., Kellman, P., Arai, A., Nielles-Vallespin, S., Chefdhotel, C., Lorenz, C.H., and Guehring, J., "Unsupervised inline analysis of cardiac perfusion MRI," in [Proc. MICCAI], 741-749 (2009).

Chefd'hotel C. Hermosilo, G. and Faugeras, O. "Flows of diffeomorphisms for multimodal image registration" in [Proc. IEEE ISBI], 753-756 (2002).

Viola, P. and Jones, M.J., "Robust real-time face detection," International Journal of Computer Vision 57(2), 137-154 (2004).

Zheng, Y., Barbu, A., Georgescu, B., Scheuering, M., and Comaniciu, D., "Fast automatic heart chamber segmentation from 3D CT data using marginal space learning and steerable features," in [Proc. ICCV], (2007).

Tu, Z., "Probabilistic boosting-tree: Learning discriminative models for classification, recognition, and clustering," in [Proc. ICCV], 1589-1956 (2005).

Jolly, M.-P., Xue, H., Lu, X., Guetter, C., Kellman, P., Hsu, L.-Y., Arai, A.E., Zuehlsdorff, S., and Guehring, J., "Automatic per-segment analysis of myocardial perfusion MRI," in [SCMR/Euro CMR Joint Scientific Sessions], (2011).

* cited by examiner (a)

(b)

DETECTION OF LANDMARKS AND KEY-FRAMES IN CARDIAC PERFUSION MRI USING A JOINT SPATIAL-TEMPORAL CONTEXT MODEL

CROSS-REFERENCE TO RELATED APPLICATION

This application claims priority under 35 U.S.C. §119 to U.S. Provisional Application No. 61/385,180, filed Sep. 22, 2010, the disclosure of which is incorporated by reference herein in its entirety.

BACKGROUND OF THE INVENTION

1. Technical Field

The present invention relates to cardiac perfusion magnetic resonance imaging (MRI), and more particularly, to the automated detection of anatomic landmarks and key-frames from perfusion MRI sequences.

2. Discussion of the Related Art

Myocardial first-pass perfusion cardiovascular MRI has significantly advanced over the last decade and has shown a great deal of value in clinical applications for diagnosis and prognosis in heart diseases. However, clinical routine applications of cardiac perfusion MRI are time-consuming due to the analysis of perfusion data.

Precise information on both morphology and functions of the left ventricle (LV) and the right ventricle (RV) is helpful in cardiology. Anatomic landmarks can be used for anchoring these structures of interest. For example, LV blood pool center indicates the location of the LV. Anchoring RV insertion (e.g., the intersection between the RV outer boundary and the LV epicardium) helps analyze LV functions according to American Heart Association myocardial segmentation models.

In perfusion MRI sequences, identifying a key-frame in a consistent manner provides a reference frame to computationally compensate for cardiac motions caused by respiration, irregular heart rates and imperfect cardiac gating. FIG. 1 shows an example of a cardiac perfusion MRI sequence 100. In FIG. 1, the frame index is annotated at the upper-left corner.

Anatomic landmark detection can be formulated into an object detection framework. Learning based object detection approaches have demonstrated their capabilities to handle large variations of an object by exploring a local region, e.g., a context. Conventional two-dimensional (2D) approaches, however, take into account spatial context only, or spatial and temporal contexts separately.

SUMMARY OF THE INVENTION

In an exemplary embodiment of the present invention, instead of utilizing spatial context only or both spatial and temporal contexts separately, there is provided a joint spatial-temporal context model (also referred to as "the contextual model") under a learning-based object detection framework to automatically detect anatomic landmarks and identify key-frames (a key-frame could be different for different heart chambers) simultaneously. The contextual model is applied to a three-dimensional (3D) volume reconstructed from an original perfusion magnetic resonance imaging (MRI) sequence. In addition, because each individual landmark has limited local evidence to identify, context is constructed not only based on individual landmarks (also referred to as "the target" or "the target landmarks"), but also landmarks that are correlated to the target. Taking into account correlations among landmarks and across the temporal dimension includes more evidence and enhances the discriminative capabilities of the contextual model. The target landmarks may include right ventricle (RV) insertion points and left ventricle (LV) center. And the key-frames may be identified for both RV and LV.

In an exemplary embodiment of the present invention, there is provided a method including: receiving an image sequence, wherein the image sequence includes a plurality of two-dimensional (2D) image frames of an organ arranged in a time sequence; constructing a 3D volume by stacking a plurality of the 2D image frames in time order; detecting a best bounding box for a target of interest in the 3D volume, wherein the best bounding box is specified by a plurality of parameters including spatial and temporal information contained in the 3D volume; and determining the target of interest from the best bounding box.

The image sequence may include a perfusion MRI sequence. The organ may include a heart. The target of interest may include an LV center point, RV insertion points, an LV key-frame or an RV key-frame.

Detecting a best bounding box for a target of interest may include: (a) setting values for a nine-parameter set, wherein the nine-parameters set defines a box-like sub-volume in the 3D volume and the nine parameter set includes three positions, x,y,z, three orientations $\gamma,\phi,\psi$ and three scales sx,sy,sz; (b) extracting the sub-volume from the 3D volume; (c) applying the sub-volume to a pre-learned model for the target of interest; and (d) assigning a classification value to the sub-volume using the pre-learned model.

The method may further include repeating a-d for a predetermined number of times each time with at least one different value for the nine-parameter set, wherein the sub-volume with a highest classification value is the best bounding box.

The pre-learned model may use a machine-learning algorithm to automatically extract features to distinguish the target of interest from background.

The target of interest may be determined from the best bounding box by using a one-to-one mapping between the target of interest and the best bounding box.

In an exemplary embodiment of the present invention, there is provided a computer program product including: a non-transitory computer readable storage medium having computer readable program code embodied therewith, the computer readable program code comprising: computer readable program code configured to perform the steps of: receiving an image sequence, wherein the image sequence includes a plurality of 2D image frames of an organ arranged in a time sequence; constructing a 3D volume by stacking a plurality of the 2D image frames in time order; detecting a best bounding box for a target of interest in the 3D volume, wherein the best bounding box is specified by a plurality of parameters including spatial and temporal information contained in the 3D volume; and determining the target of interest from the best bounding box The image sequence may include a perfusion MRI sequence. The organ may include a heart. The target of interest may include an LV center point, RV insertion points, an LV key-frame or an RV key-frame.

Detecting a best bounding box for a target of interest may include: (a) setting values for a nine-parameter set, wherein the nine-parameters set defines a box-like sub-volume in the 3D volume and the nine parameter set includes three positions, x,y,z, three orientations $\gamma,\phi,\psi$ and three scales sx,sy,sz; (b) extracting the sub-volume from the 3D volume; (c) applying the sub-volume to a pre-learned model for the target of interest; and (d) assigning a classification value to the sub-volume using the pre-learned model.

The computer readable program code is further configured to perform the step of repeating a-d for a predetermined number of times each time with at least one different value for the nine-parameter set, wherein the sub-volume with a highest classification value is the best bounding box.

The target of interest is determined from the best bounding box by using a one-to-one mapping between the target of interest and the best bounding box.

In an exemplary embodiment of the present invention, there is provided a method including: receiving a cardiac perfusion MRI sequence, wherein the cardiac perfusion MRI sequence includes a plurality of 2D image frames of a heart arranged in a time sequence; constructing a 3D volume by stacking a plurality of the 2D image frames in time order; detecting a bounding box enclosing a landmark in the 3D volume, wherein the bounding box is specified by a plurality of parameters including spatial and temporal information contained in the 3D volume; and determining the landmark and its associated key-frame from the bounding box.

The landmark and its associated key-frame may be determined simultaneously. The landmark may be a center part of an LV of the heart and the key-frame is a 2D image frame in which an upslope along a signal intensity curve for the LV reaches a maximum in the time sequence. The landmark may include RV insertion points and the key-frame is a 2D image frame in which an upslope along a signal intensity curve for the RV reaches a maximum in the time sequence. The RV insertion points may include the RV anterior insertion point and the RV inferior insertion point. Key-frame definition can vary in different applications.

DETAILED DESCRIPTION OF EXEMPLARY EMBODIMENTS

An overall workflow of a method for the detection of landmarks and key-frames in a cardiac perfusion magnetic resonance imaging (MRI) sequence using a joint spatial-temporal context model, according to an exemplary embodiment of the present invention, will now be discussed, in brief, with primary reference to FIG. 2. Detailed explanations of the workflow in FIG. 2 will then follow with reference to the remainder of the figures.

Figure 1:
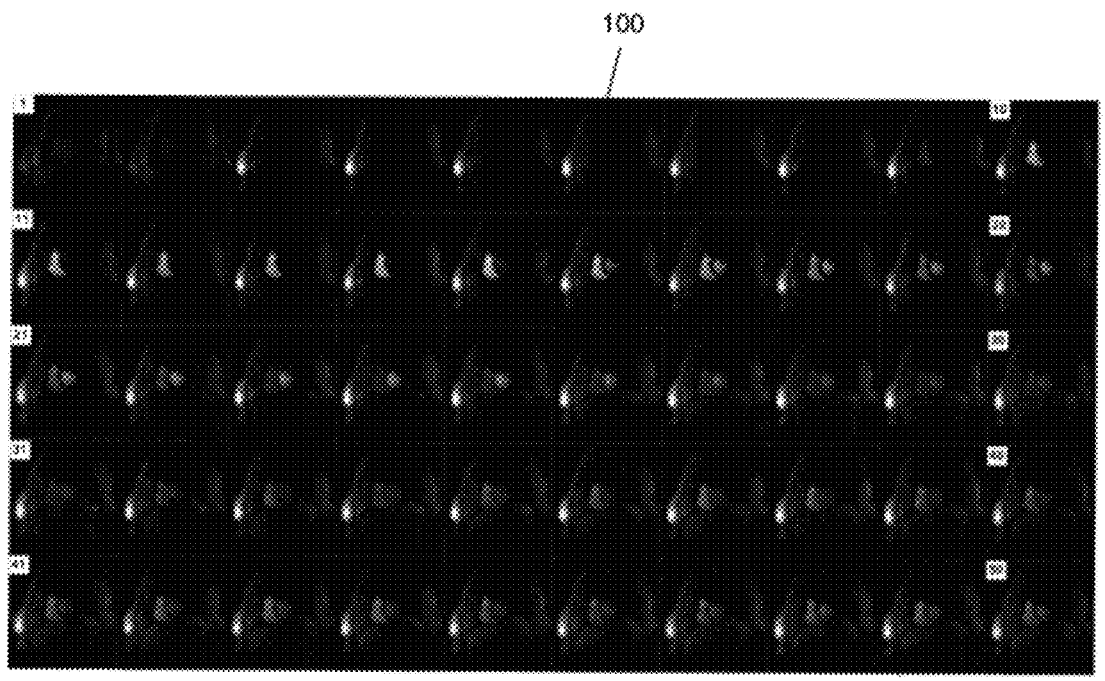
FIG. 1 illustrates an example of a cardiac perfusion magnetic resonance imaging (MRI) sequence.
Figure 2:
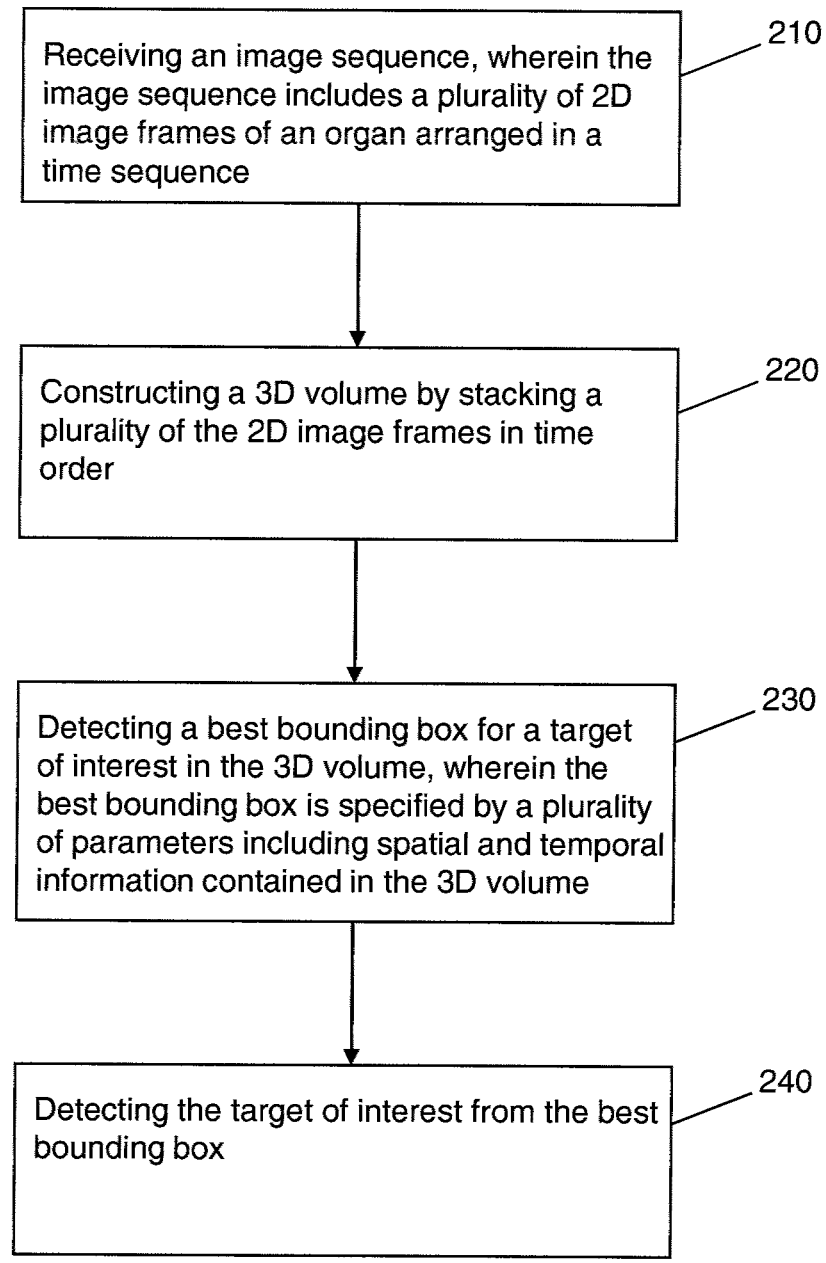
FIG. 2 is a flowchart illustrating detection of landmarks and key-frames in a cardiac perfusion MRI sequence using a joint spatial-temporal context model, according to an exemplary embodiment of the present invention.
Figure 9:
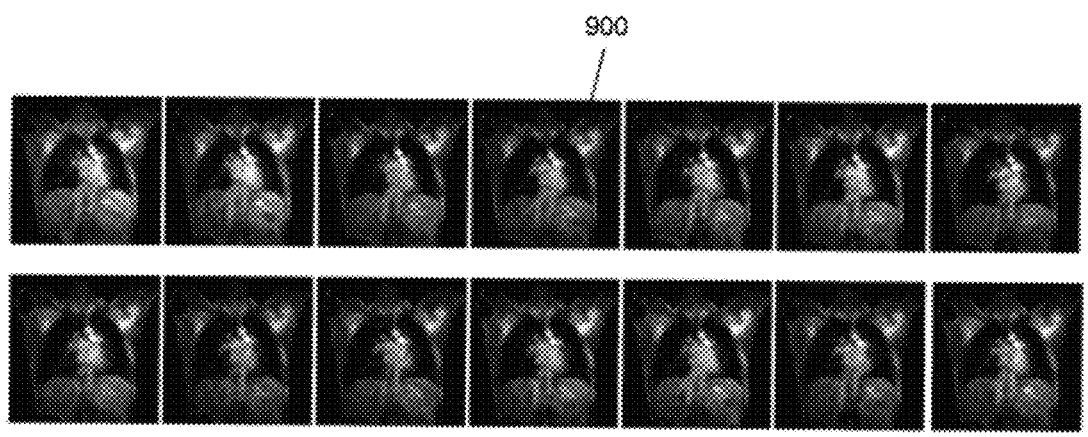
FIG. 9 illustrates an example of a chest MRI sequence.

The following discussion formulates the simultaneous landmark and key-frame detection of FIG. 2 into a three-dimensional (3D) object detection framework. Referring to FIG. 2, an image sequence is received (210). The image sequence includes a plurality of two-dimensional (2D) image frames of an organ arranged in a time sequence. An example of the received image sequence may be the cardiac perfusion MRI sequence 100 of FIG. 1. However, the present invention is not limited thereto. For example, the received image sequence may be chest MRI sequence 900 in FIG. 9.

A three-dimensional (3D) volume is constructed by stacking a plurality of the 2D image frames in time order (220). More specifically, 2D image frames of the cardiac perfusion MRI sequence are stacked along the temporal dimension, resulting in a 3D volume with the x and y dimensions representing the original spatial domain of each acquired image frame and the z dimension indicating the temporal axis of the frame index in the time order of image sequence acquisition. An example of the 3D volume construction from the cardiac perfusion MRI sequence 100 of FIG. 1 is shown in FIGS. 3A and 3B.

Figure 3A:
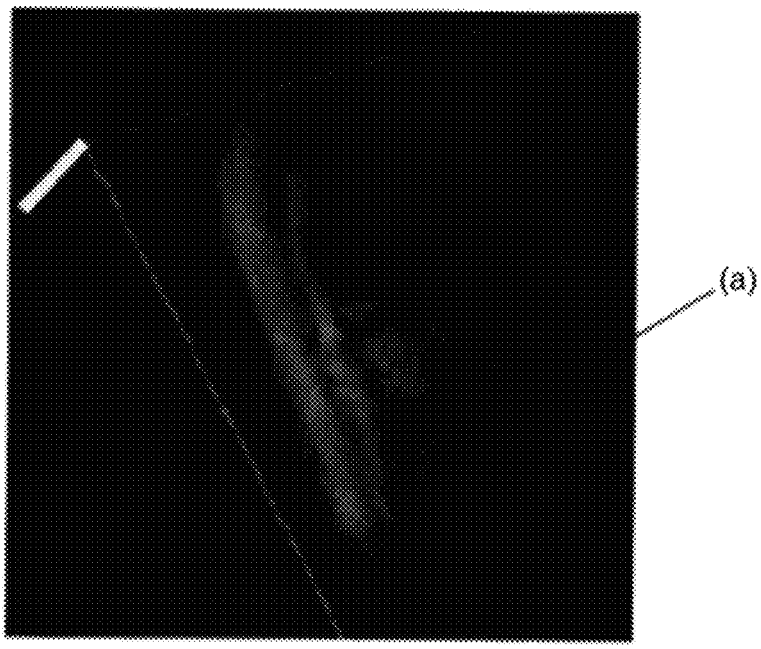
FIGS. 3A and 3B illustrate part of a 3D volume reconstructed from a cardiac perfusion MRI sequence, according to an exemplary embodiment of the present invention.
Figure 3A:
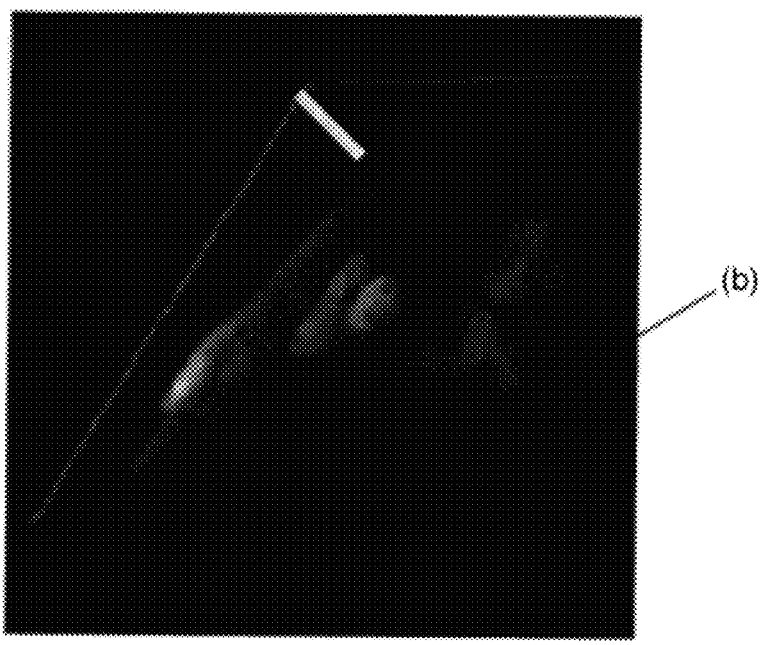
Figure 3B:
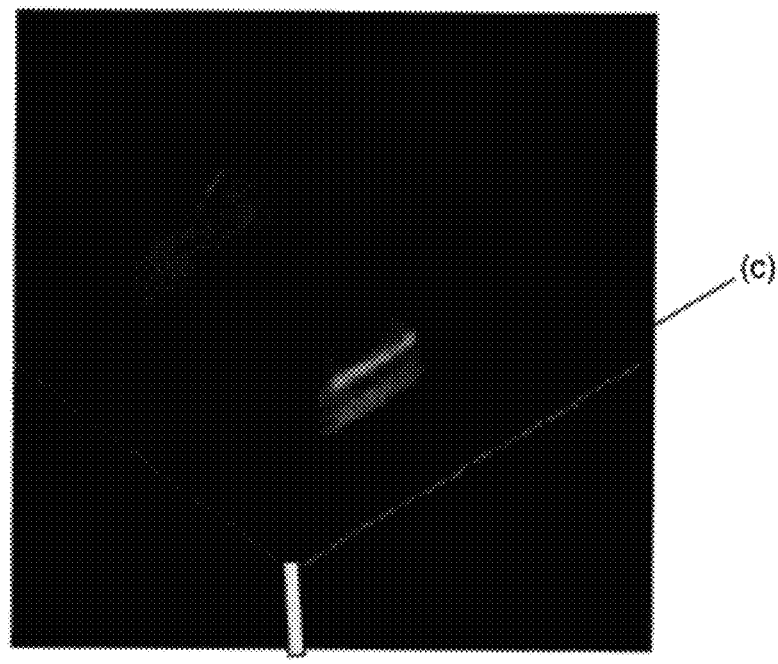
Figure 3B:
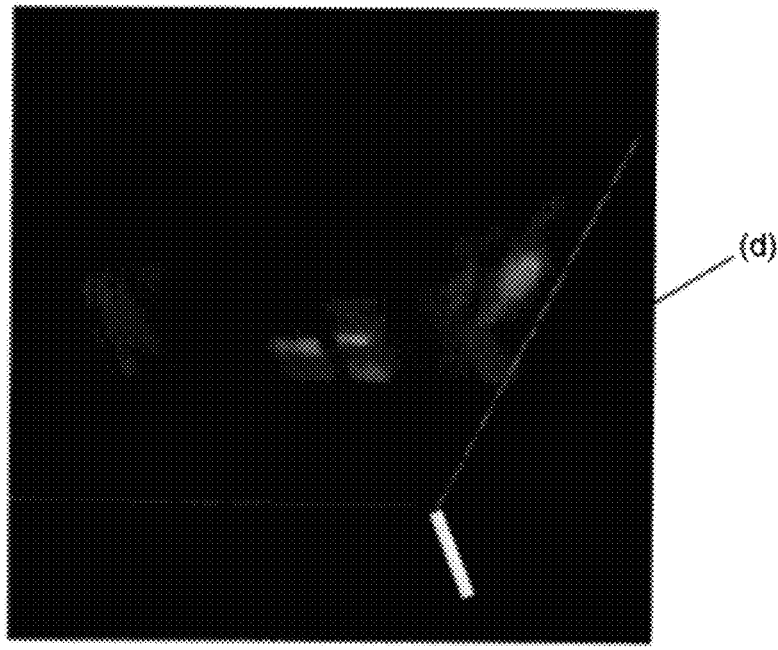

Image (a) in FIG. 3A shows a volumetric rendering of the 3D volume. Image (b) of FIG. 3A shows a cross-section with the perfusion-scanning plane. Images (c) and (d) of FIG. 3B show two cross-sections along the temporal dimension. In FIGS. 3A and 3B the z axis is denoted by the brightest axis, the x axis is denoted by the least bright axis and the y axis is denoted by the axis of middle brightness.

A best bounding box for a target of interest is detected in the 3D volume (230). In 230, a 3D context box (e.g., a bounding box) is designed based on the target. The joint spatial-temporal context model, which may be learned from a large annotated database offline, is applied to the 3D context box to detect the best 3D context box for the target. Because parameter mapping between the 3D context box and the target is bijective, the target is calculated by an inverse mapping from the best 3D context box (240).

When dealing with a cardiac perfusion MRI sequence, the target may be the center of the left ventricle (LV), a key-frame for the LV, insertion points for the right ventricle (RV), or a key-frame for the RV. The RV insertion points include the RV anterior insertion point and the RV inferior insertion point. Each of the key-frames may be defined as the time frame when the upslope along the signal intensity curve reaches the maximum for the respective chamber (e.g., RV and LV). A key-frame for the LV may be one of frames 18-22 of FIG. 1. A key-frame for the RV may be one of frames 10 or 11 of FIG. 1. Another target example may the lung tips in FIG. 9.

With the overall workflow having been presented, the 3D context boxes, used in 230, will now be discussed.

3D context boxes are constructed based on their respective targets of interest, taking into account both spatial and temporal context contained in the 3D volumetric data reconstructed from the cardiac perfusion MRI sequence. A constructed context box captures rich information so that discriminative features can be extracted to distinguish its corresponding target from the background.

Hereinafter, a 3D context box may refer to the raw data contained within the sub-volume defined by the 3D context box. The sub-volume is part of the 3D volumetric data reconstructed from the cardiac perfusion MRI sequence. Further, when appended with models, the 3D context box refers to the entire bounding box enclosing the target of interest.

A 3D context box is specified by a nine-parameter set $\Theta$, containing three positions $<x,y,z>$, three orientations $<\gamma,\phi,\psi>$, and three scales $<sx,sy,sz>$. Three orientations are the Eular angles. In the joint spatial-temporal context model, which contains features extracted from the 3D context box not the raw data in the 3D context box, only in-plane (within slice) orientation is used. Therefore, the orientation parameters reduce to $\gamma$ only, which is the angle from the x axis within slice, with $\phi$ and $\psi$ set to zeros. The target/key-frame detection task can then be formulated into estimating this set of parameters. Although only positions are used as the output, e.g., $<x,y>$ for in-plane landmark coordinates and $<z>$ for the key-frame index, orientation and scales are useful in encoding proper and consistent context learned during an offline training process (discussed later), where a set of contextual models/classifiers are obtained.

The contextual model integrates intra-anatomy and inter-anatomy context. For example, the LV center context is constructed utilizing not only the LV center, but also the RV insertion points to establish proper scales; the orientation for the RV insertion context box is dependent on the LV center. Such rich contextual information enhances the discriminative capability of the contextual models.

Figure 4:
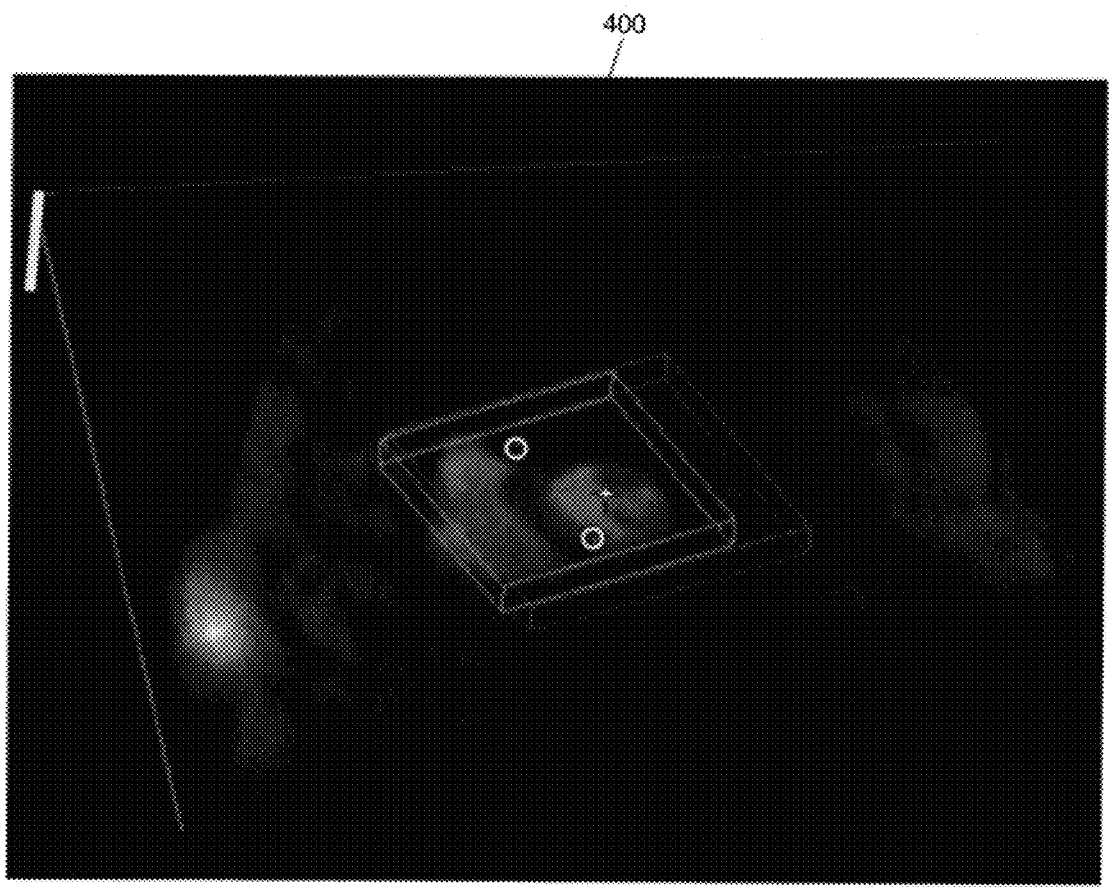
FIG. 4 illustrates a constructed spatial-temporal context model for right ventricle (RV) insertion and left ventricle (LV) center, according to an exemplary embodiment of the present invention.
Figure 5A:
FIGS. 5A-M illustrate maximum intensity projection (MIP) perfusion images calculated from an original cardiac perfusion MRI sequence showing three target landmarks using the method of claim 2.
Figure 5B:
Figure 5C:
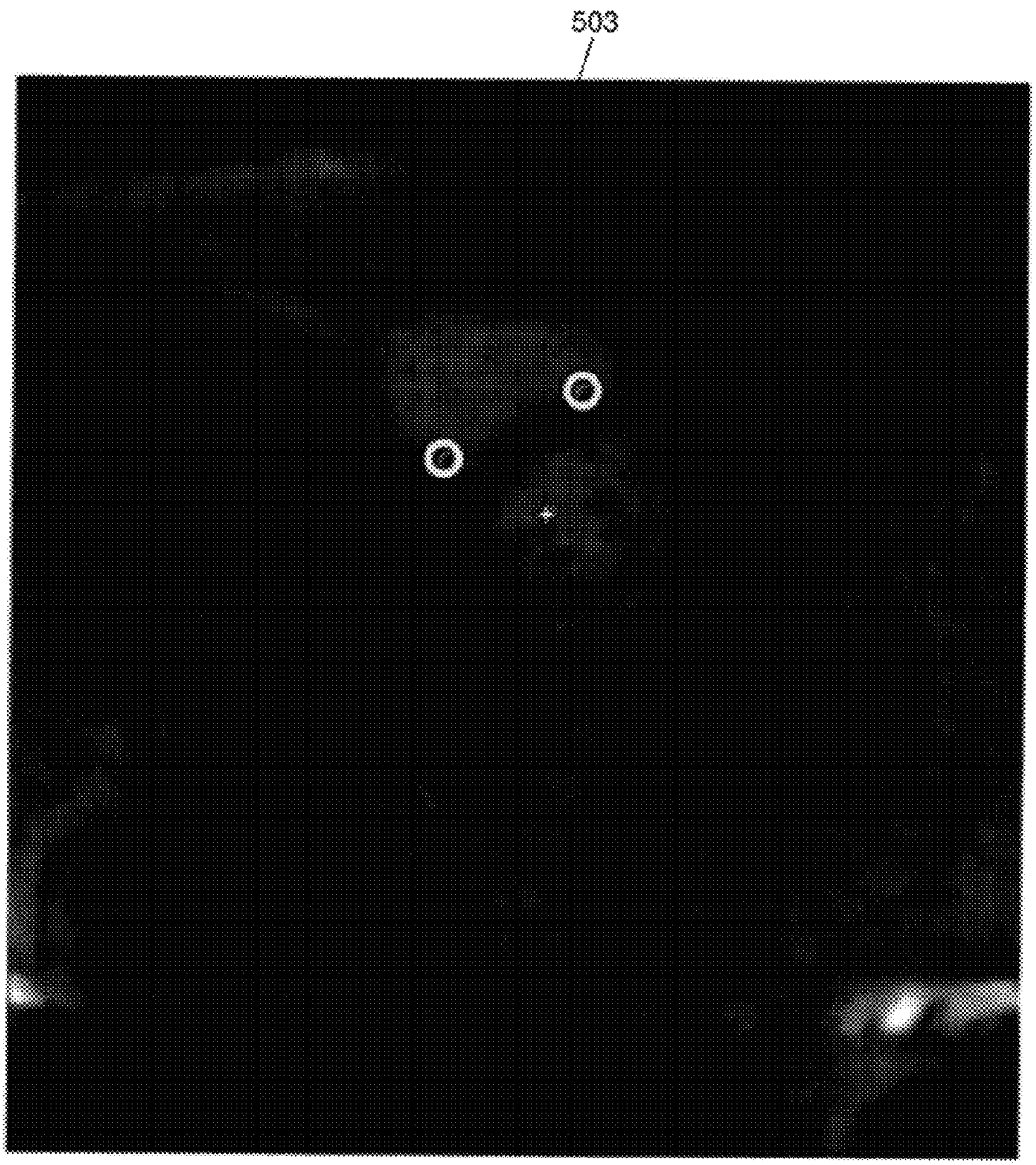
Figure 5D:
Figure 5E:
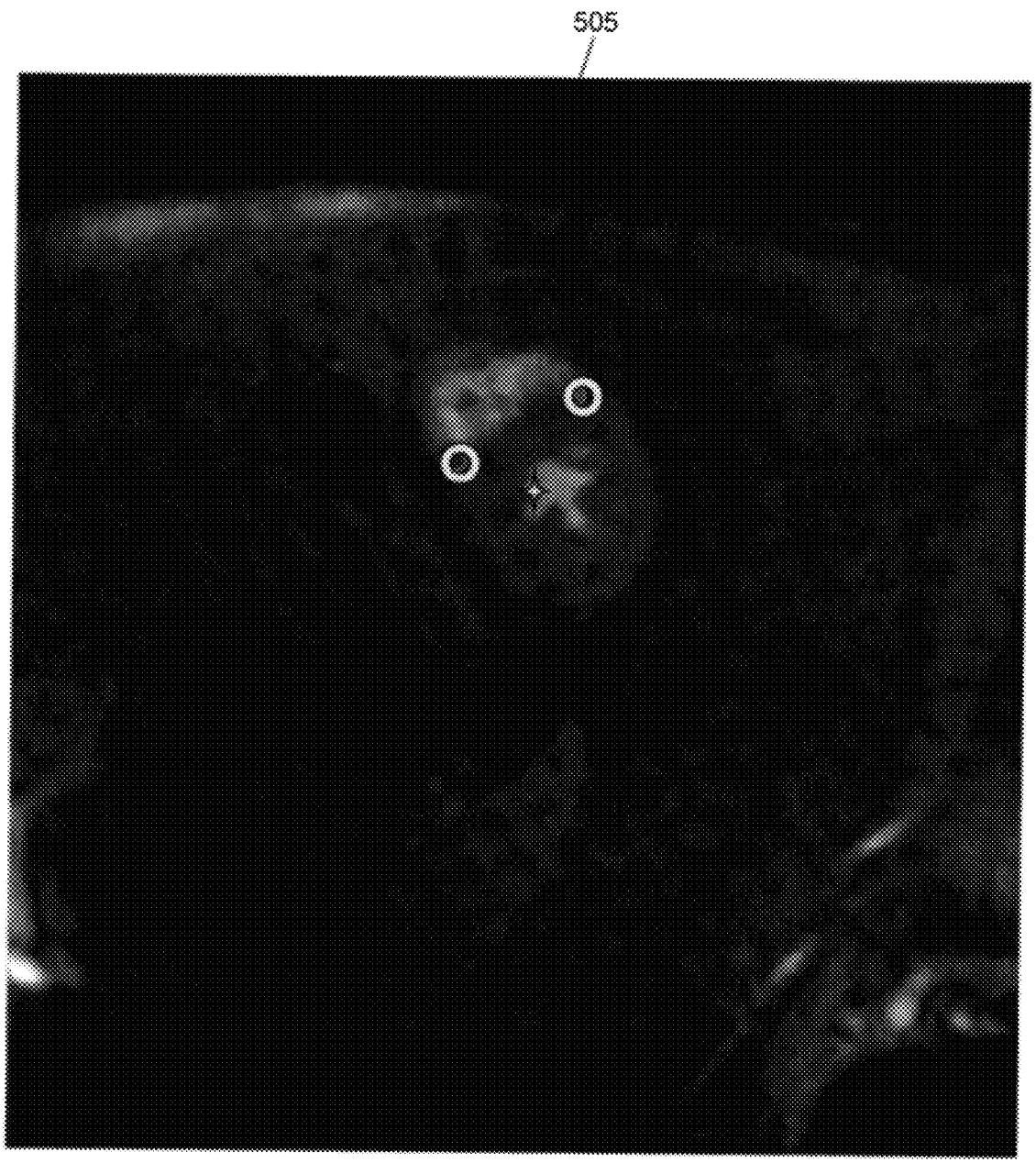
Figure 5F:
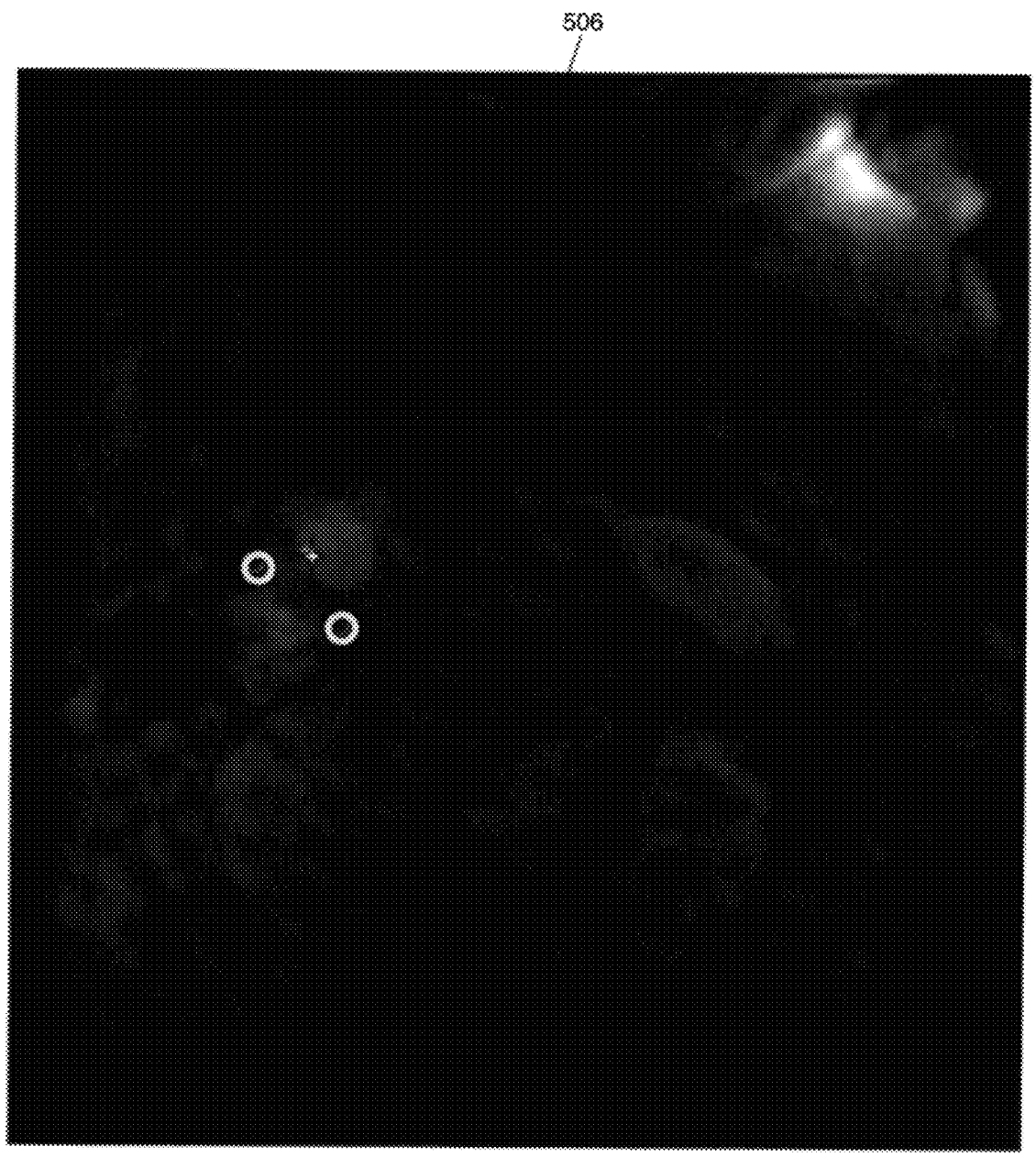
Figure 5G:
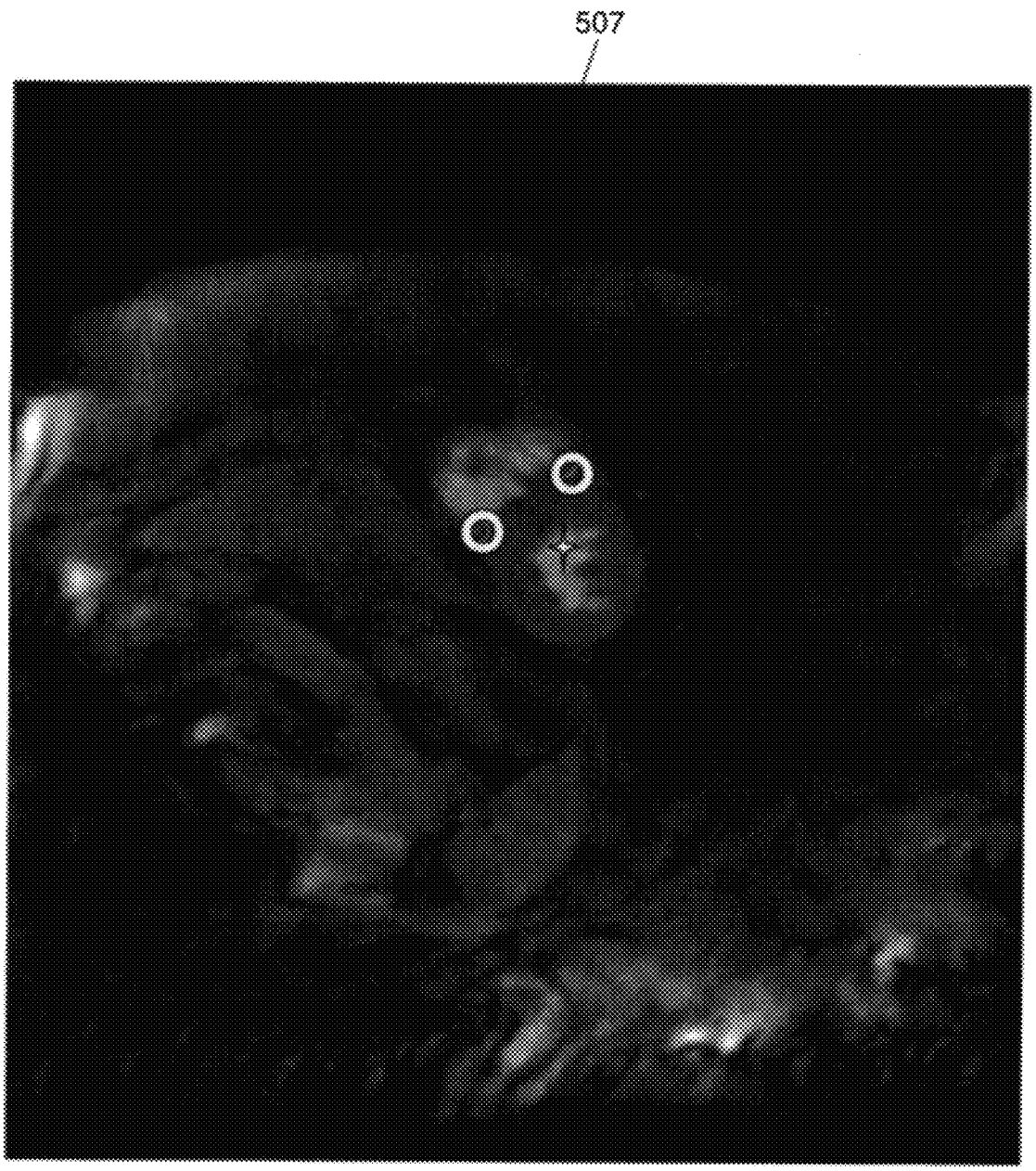
Figure 5H:
Figure 5I:
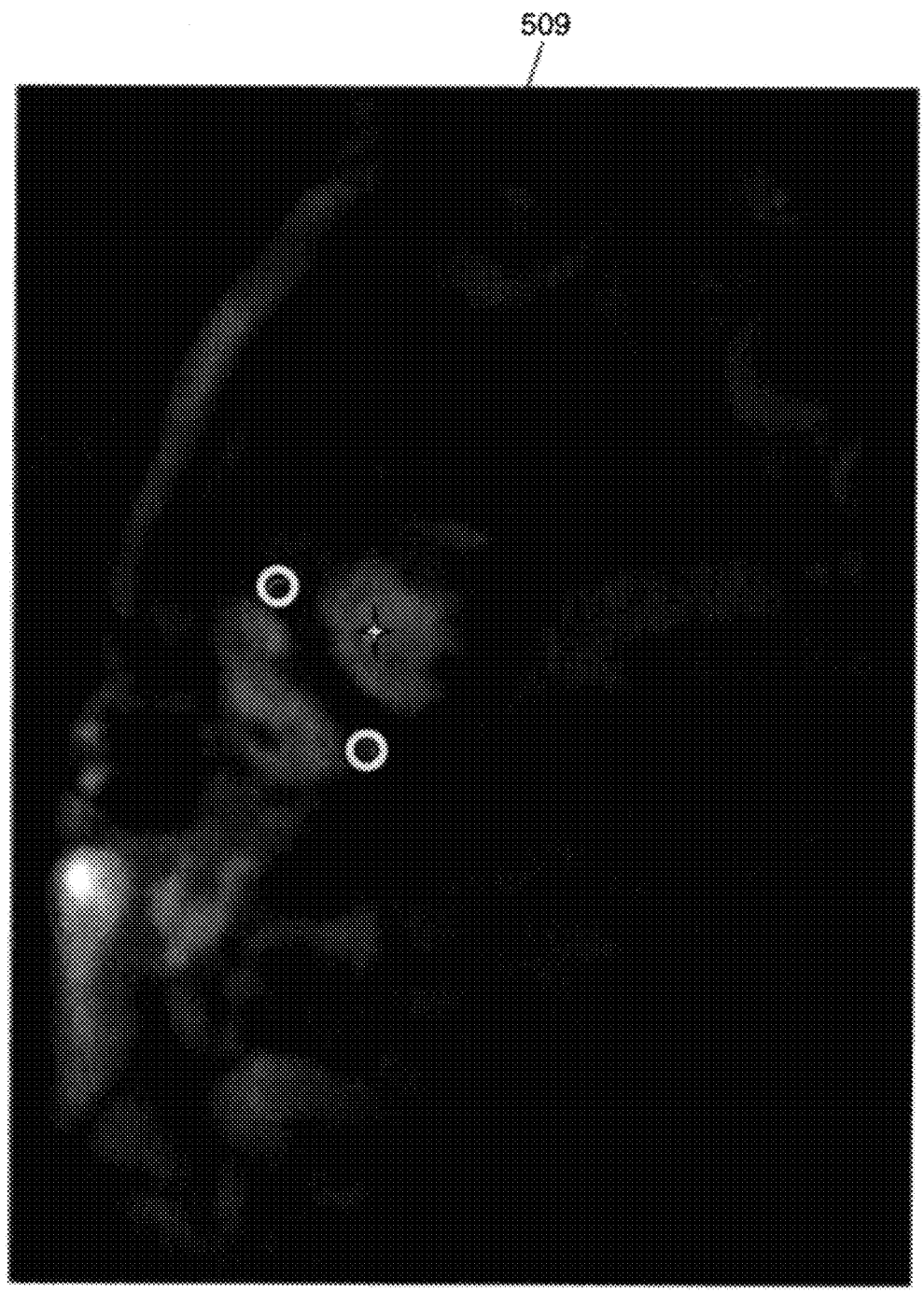
Figure 5J:
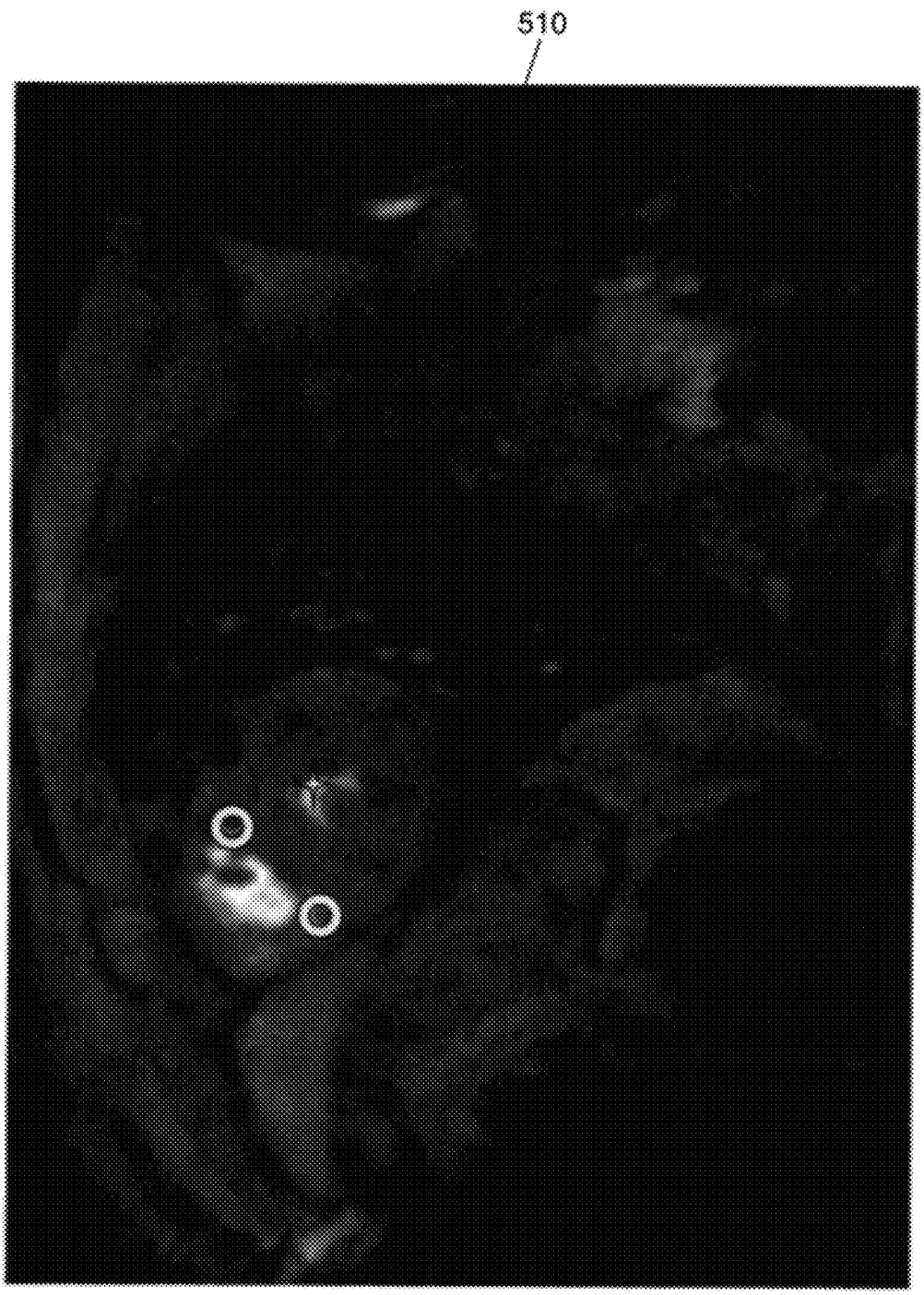
Figure 5K:
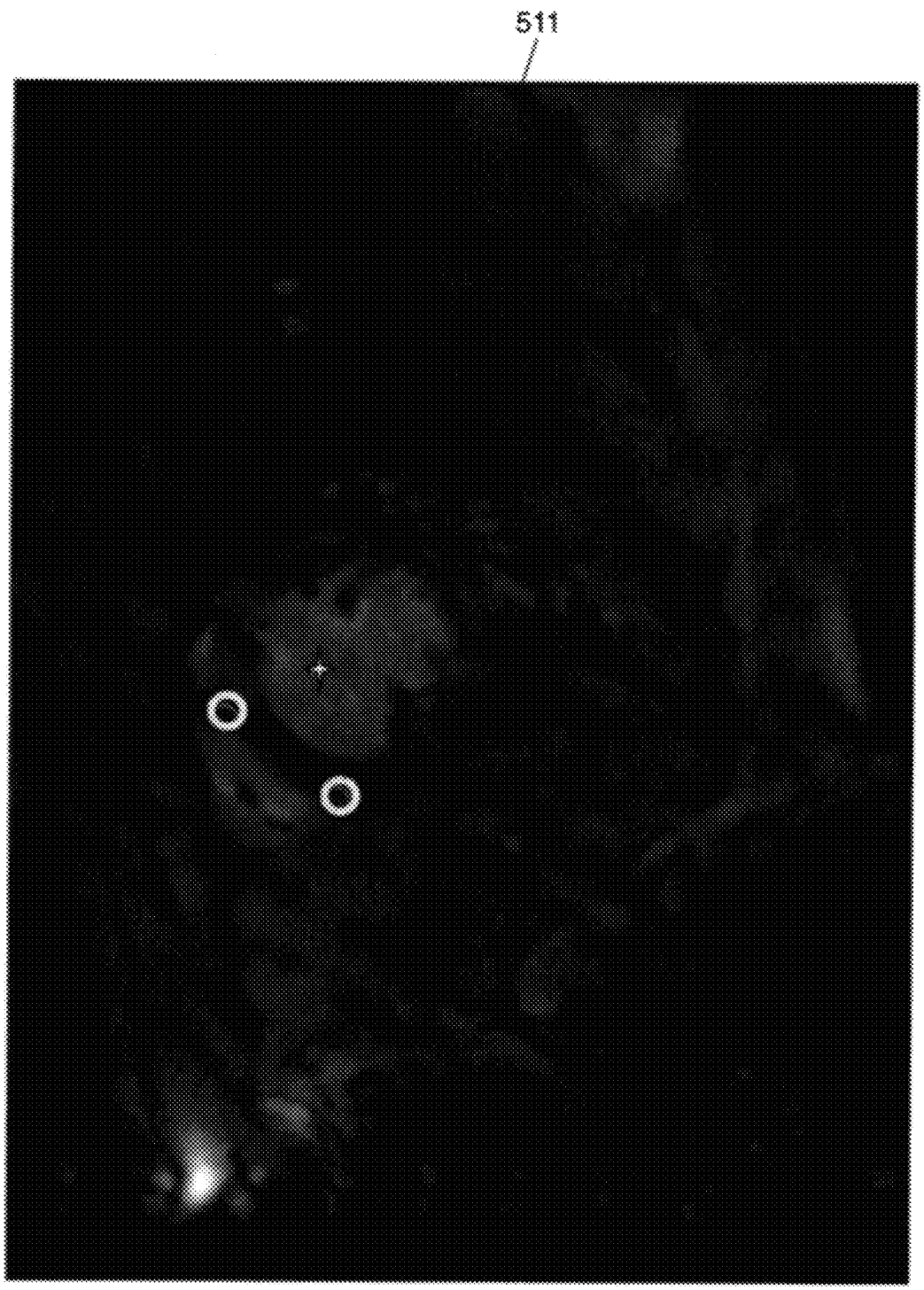
Figure 5L:
Figure 5M:
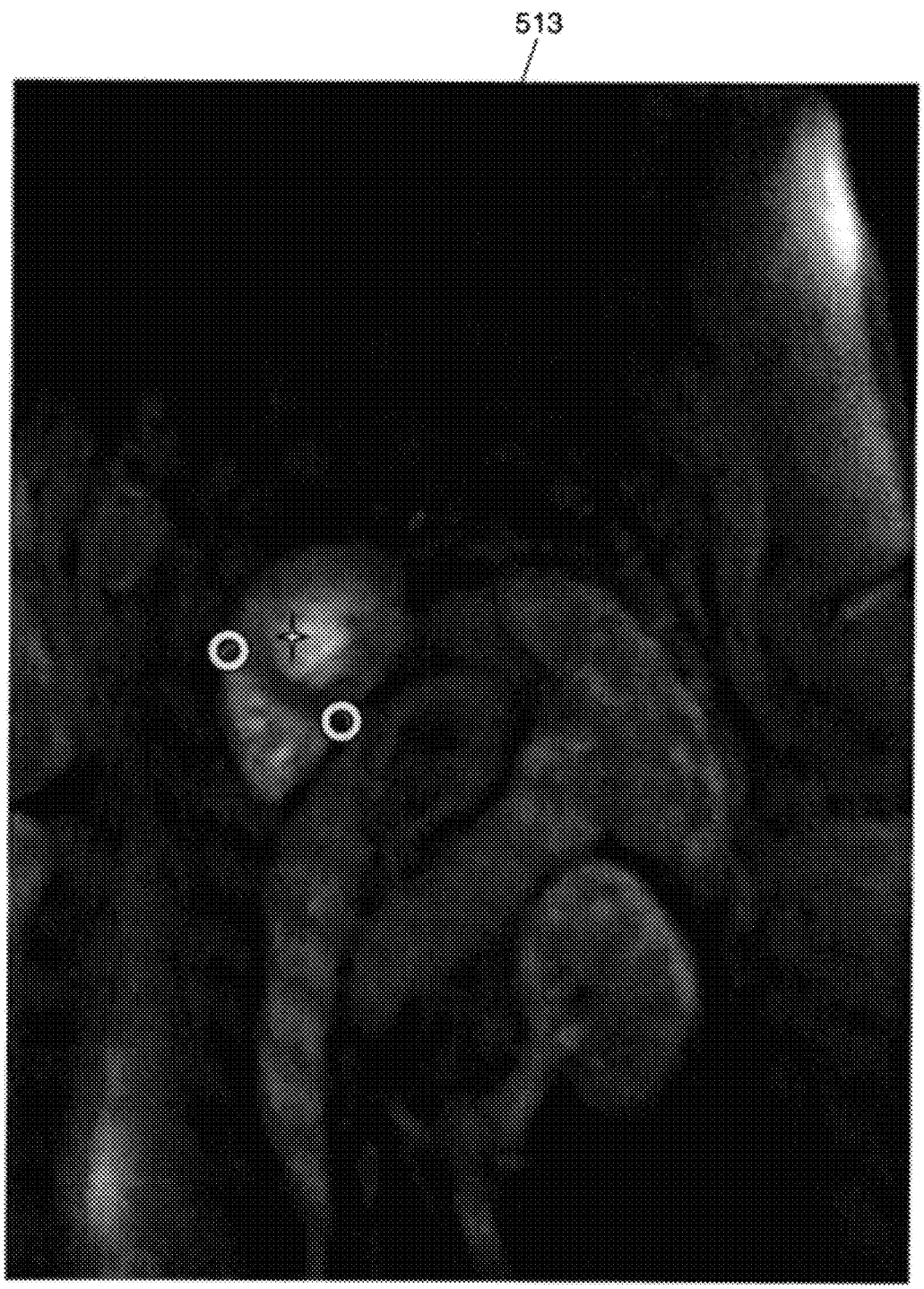

FIG. 4 is an image 400 showing two 3D context boxes. The top box of image 400 is the 3D context box for the RV insertion points, the bottom box of image 400 is the 3D context box for the LV. The bright circles in the top box of image 400 correspond to the ground truth for the RV insertion points, and the star cross in the bottom box of image 400 corresponds to the ground truth for the LV center.

The 3D context box for the RV insertion points will now be described in more detail.

For the RV insertion points, the anterior and inferior landmarks are identified through the following context modeling. Let $<x_{an},y_{an}>$ and $<x_{in},y_{in}>$ denote the true positions of the RV insertion anterior and RV insertion inferior, respectively. The time frame indices for the key-frame and the peak-frame of RV are expressed as $t_{RV}$ and $t_{pRV}$, respectively. The contextual parameter set for RV insertion is: positions $\{(x_{an}+x_{in})/2, (y_{an}+y_{in})/2, t_{RV}\}$; orientations $\{\gamma$: orthogonal to the line segment connecting RV insertion anterior and RV insertion inferior, and pointing toward the LV, $\phi=0$, $\psi=0\}$; and scales $\{s_{ins},s_{ins},(t_{pRV}-t_{RV})*\alpha\}$, where $s_{ins}=\sqrt{(x_{an}-x_{in})^2+(y_{an}-y_{in})^2}*\beta$. $\alpha$ and $\beta$ are factors that can be used to adjust the contextual range, which are set to 2.4 and 1.5, respectively, in the experiments to be discussed hereinafter. Selection of $\alpha$ and $\beta$ is a tradeoff between rich context and noise. The scale setting for the z (temporal) dimension may be designed to cover the foot-to-peak range.

The 3D context box for the LV center will now be described in more detail.

For the LV center, let $<x_c,y_c>$ denote the position of the LV center. $t_{LV}$ and $t_{pLV}$ represent the key-frame and peak-frame indices of the LV. The conceptual parameter set for the LV center is constructed as: positions $\{x_c,y_c,t_{LV}\}$; orientations $\{\gamma$: orthogonal to the line segment connecting the two RV insertion points, and pointing toward the RV, $\phi=0$, $\psi=0\}$; and scales $\{s_{LVC},s_{LVC},(t_{pLV}-t_{LV})*\rho\}$, where $s_{LVC}=(\sqrt{(y_{in}-y_c)^2+(x_{in}-x_c)^2}+\sqrt{(y_{an}-y_c)^2+(x_{an}-x_c)^2})*\omega$.

Learning-based detection (also used in 230) with the 3D context boxes will now be discussed.

In brief, to detect a best bounding box for a target, values for a nine-parameter set (mentioned above) are established, wherein the nine-parameter set defines a box-like sub-volume in the 3D volume. In other words, values are set to construct a 3D context box for the target. The sub-volume defined by the 3D context box for the target is extracted from the 3D volume. The sub-volume is applied to a pre-learned model (e.g., the discriminative model to be discussed hereinafter) for the target. A classification value is then given to the sub-volume using the pre-learned model. This process may be repeated a predetermined number of times, each time with at least one different value for the parameters, and a sub-volume with the highest/best classification value is deemed the best bounding box for the target.

More specifically, to utilize the constructed 3D context boxes for object detection, a discriminative model is built. The discriminative model is built to differentiate a true object from background by calculating the probability of given context (of a candidate) being at get object. This may be formulated as a two-category classification problem, e.g., true object vs. background. Discriminative features from context (here context may refer to any useful information contained within the 3D context box) are extracted and learned by a machine algorithm based on experts' annotations, resulting in a probabilistic model for each target (landmarks+key-frame) context. The online detection algorithm searches through multiple hypotheses (parameter values) in the parameter space to identify the ones with high probabilities.

Context-based detection is done to estimate the parameter set, $\Theta$, of an object target from a given volume. There are seven parameters for each context in the inventive framework, including three positions (x,y,z), one orientation ($\gamma$), and three scales along each axis (sx,sy,sz). Because exhaustively searching in this seven-dimensional space can be prohibitive for online applications, a marginal space learning based approach may be used.

The detectors are trained using positive samples based on the position, orientation, and size of the annotated object contest, while the negative set is generated by extracting sub-volumes that are further from the positive samples in the parameter space.

For each learning/classification task, a probabilistic boosting tree (PBT) may be used as the classifier. The classifier is a tree-based structure with which the posterior probabilities of the presence of the target are calculated from candidate context in given volumes. Following the marginal space learning strategy, a series of classifiers may be designed that estimate parameters at a number of sequential stages in the order of complexity, i.e., translation, orientation, and scale. Different stages utilize different features computed from image intensities. Multiple hypotheses are maintained between algorithm stages, which quickly removes false hypotheses at the earlier stages while propagates the right hypotheses to the final stage. Only one hypothesis may be selected as the final detection result.

Each detector selects a set of discriminative features that are used to distinguish the positive target form negatives from a large pool of features. For the classifiers at the translation stage, Haar wavelet-like features may be used, since they are calculated efficiently using integral image-based techniques. For the classifiers at the orientation and scale searching stages, steerable features are applied, because their computation does not require volume rotation and re-scaling, which are computationally expensive.

FIGS. 5A-M provide a number of examples 501-513, respectively, showing large image variations from different perfusion sequences, overlaid with landmarks of interest, e.g., LV center (star cross) and two RV insertion points (circles), detected in accordance with an exemplary embodiment of the present invention. To clearly illustrate the anatomies in one figure, instead of individual frames, the MIP calculated from an original perfusion sequence is presented.

The method of FIG. 2 was evaluated on a database of 373 cardiac perfusion MRI sequences from 77 patients. More specifically, a total of 373 perfusion series from 77 patient studies was collected, among which 83 series were captured using TrueFISP perfusion MRI sequences and 290 were captured with GRE-EPI. For each series, a spatial-temporal 3D volume was constructed. The spatial coordinates <x,y> of the three landmarks (e.g., two RV insertion points and the LV center) were manually labeled. The temporal key-frame <z> was annotated. These annotations were used as ground truth for quantitative evaluation. For comparison purposes, a MIP image was calculated for each perfusion series and the spatial context model was applied to detect the landmarks without a temporal context.

The joint spatial-temporal context model, according to an exemplary embodiment of the present invention, was applied to detect the objects of 'RV insertion' and 'LV center.' The joint spatial-temporal context model is denoted as the '2D t' approach. For each object detected, corresponding landmarks were inferred based on a reverse object/context modeling process, e.g., by calculating landmark positions from the detected parameterized bounding box. The model with spatial context only was applied to the MIP counterpart of each perfusion series to detect the landmarks. The model with spatial context only is denoted as the '2D' approach. The Euclidean distance between the detected landmark position and its corresponding ground truth was computed as the detection error for each landmark. This detection error was used as the metric to evaluate system performance on spatial landmark detection. For the '2D+t' approach, the simultaneously detected key-frame (e.g., index) was compared with the ground truth to compute the absolute difference in terms of the number of frames. This absolute difference was used as a performance valuation metric. Both '2D+1' and '2D' approaches were fully automatic.

A 4-fold cross-validation scheme was applied for evaluation. The entire database was randomly partitioned into four quarters. No data from the same patient was partitioned into different quarters. For each fold evaluation, three quarters were combined for training and the remaining one quarter was used as unseen data for testing. This procedure was repeated four times so that each series was used once for testing. Performance is summarized based on all 4 folds. For landmark detection, both '2D+t and '2D' approaches were evaluated under the same experimental protocol with the same spatial context parameters. It showed that '2D+t' outperforms '2D' in both RV and LV landmark detections, thus demonstrating the advantage of the joint spatial-temporal context model. Landmark detection performance is provided in Table 1 and FIGS. 6A and 6B. Table 2 and FIG. 7 show key-frame detection results of the joint spatial-temporal context model ('2D+t' approach).

TABLE 1

Statistics of the distance of the detected landmarks from ground truth positions by a 4-fold cross validation.

|  | Mean | Std | Median |
|---|---|---|---|
| (a) RV insertion | | | |
| 3D (2D + t) | 5.0 | 3.0 | 4.3 |
| MIP (2D) | 6.2 | 4.6 | 4.9 |

TABLE 1-continued

Statistics of the distance of the detected landmarks from ground truth positions by a 4-fold cross validation.

|  | Mean | Std | Median |
|---|---|---|---|
| (b) LV center | | | |
| 3D (2D + t) | 2.2 | 1.2 | 2.0 |
| MIP (2D) | 3.4 | 4.1 | 2.9 |

Distances are in units of mm.

Figure 6A:
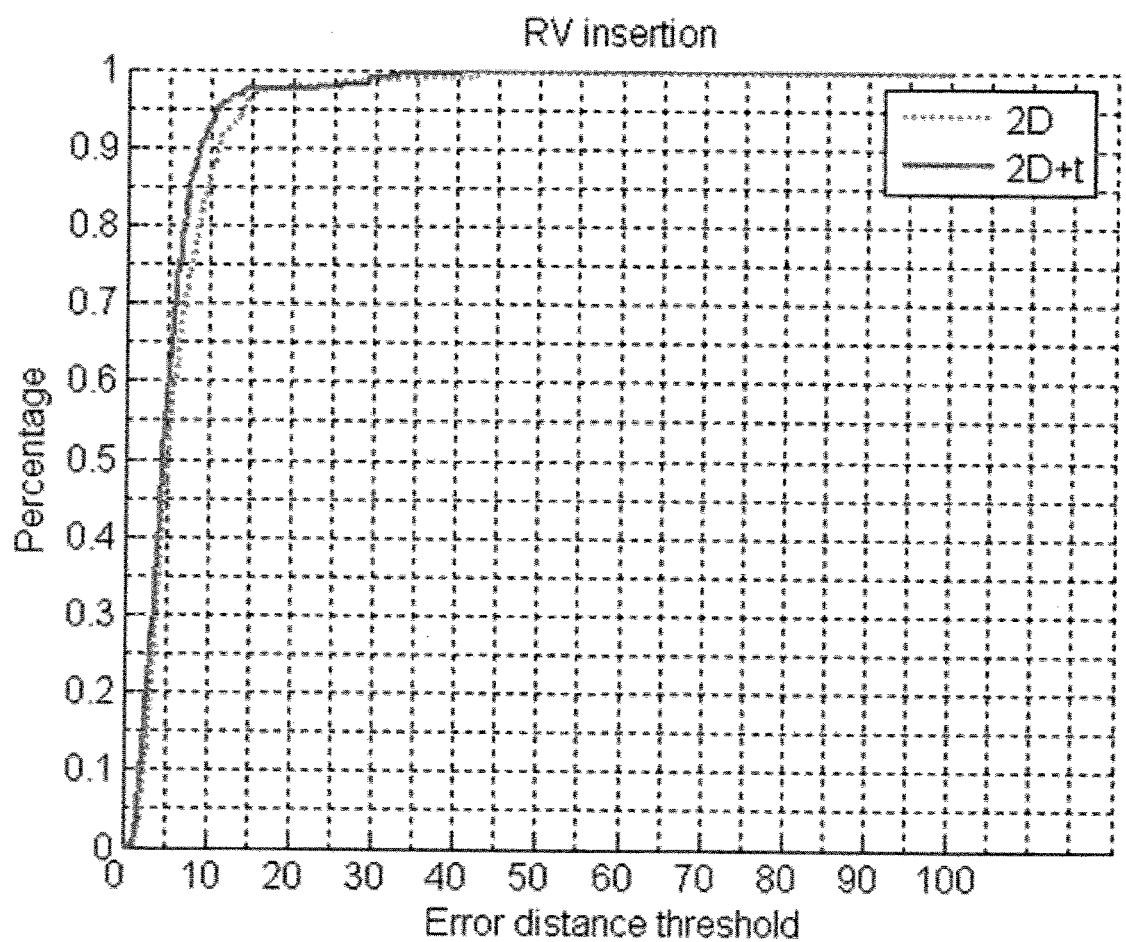
FIGS. 6A and 6B illustrate landmark evaluation results of a 4-fold cross validation on the joint spatial-temporal context model, according to an exemplary embodiment of the present invention, in comparison with a two-dimensional (2D) approach.
Figure 6B:
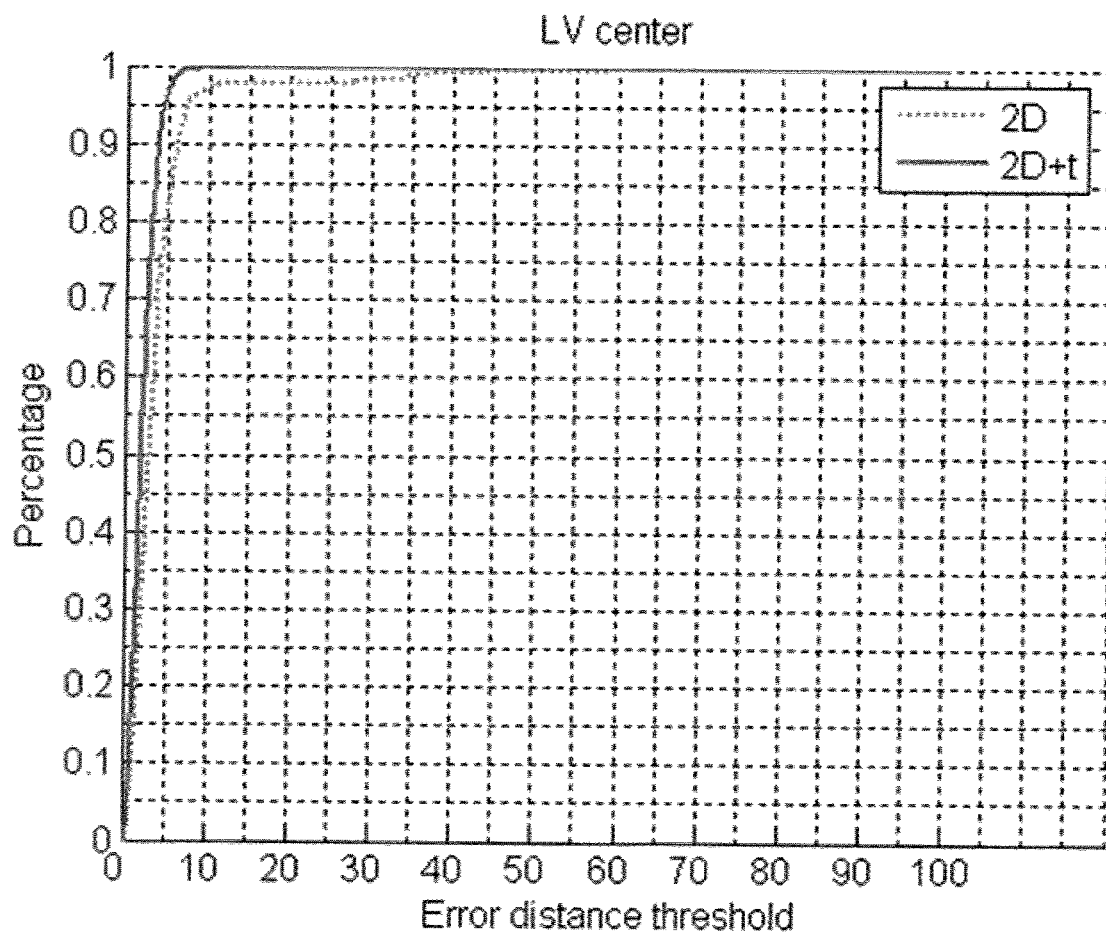
Figure 7:
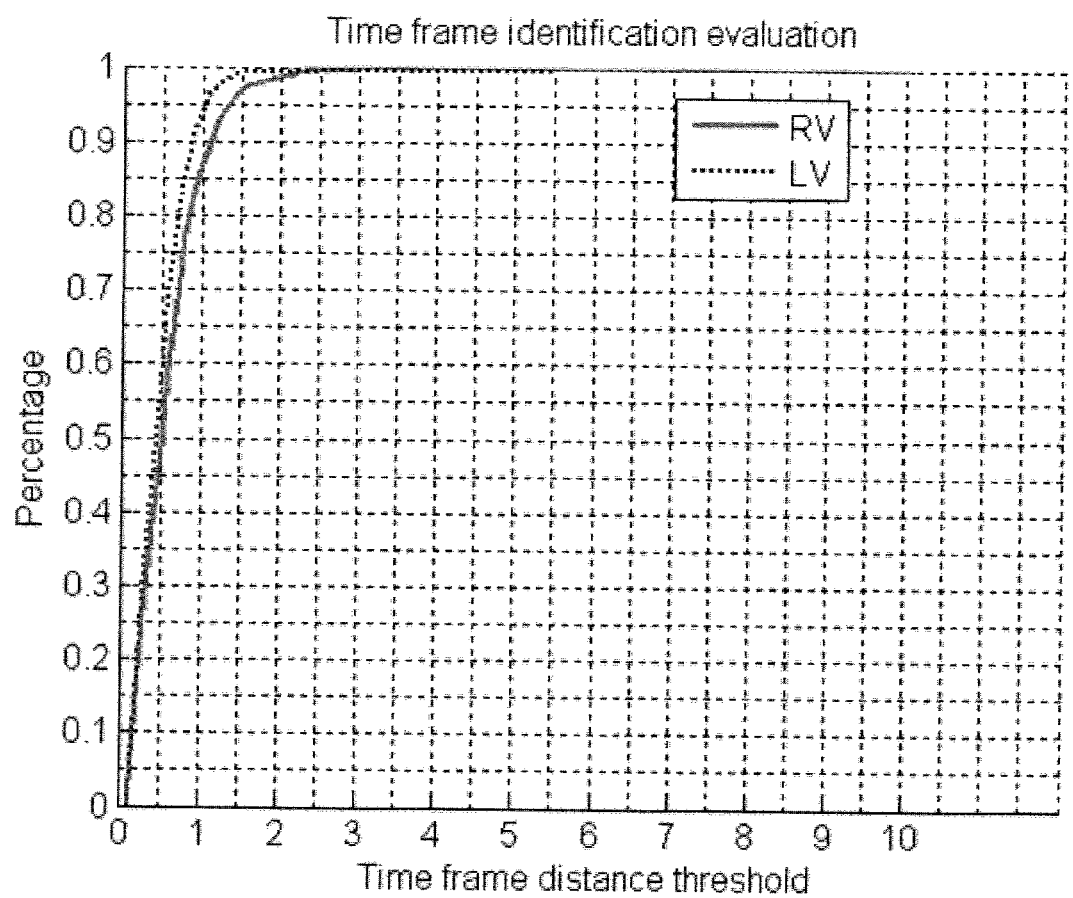
FIG. 7 illustrates key-frame identification results of the 4-fold cross validation on the joint spatial-temporal context model, according to an exemplary embodiment of the present invention.

Referring to FIGS. 6A and 6B, there are shown landmark evaluation results of the 4-fold cross validation on the joint spatial-temporal context model (2D+t), in comparison with the 2D approach (spatial only), wherein the 2D approach was applied on the MIP images calculated from each perfusion sequence. Each curve in FIGS. 6A and 6B shows the percentage of cases whose distances of the automatic detection results from ground truth is less than an error distance threshold.

TABLE 2

Statistics of the distance of the detected key-frame from ground truth by a 4-fold cross validation.

|  | Mean | Std | Median |
|---|---|---|---|
| RV | 0.77 | 0.55 | 0.51 |
| LV | 0.62 | 0.77 | 0.45 |

Distance is measured in the number of frames.

Referring to FIG. 7, key-frame identification results of the 4-fold cross validation are shown. In FIG. 7, each curve shows the percentage of cases whose absolute distance of the automatically detected key-frame index from ground truth is less than an error distance threshold.

In accordance with an exemplary embodiment of the present invention, described above is a joint spatial-temporal context model based approach that is integrated into a learning-based object detection framework. Using this approach, there is provided a fully automatic system to detect landmarks from cardiac MRI perfusion series, along with the key-frame identified simultaneously. In the aforementioned experiments, the target landmarks include the RV insertion points and the LV center, which facilitated fully automated segmental analysis on perfusion data. The approach is not limited to these landmarks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
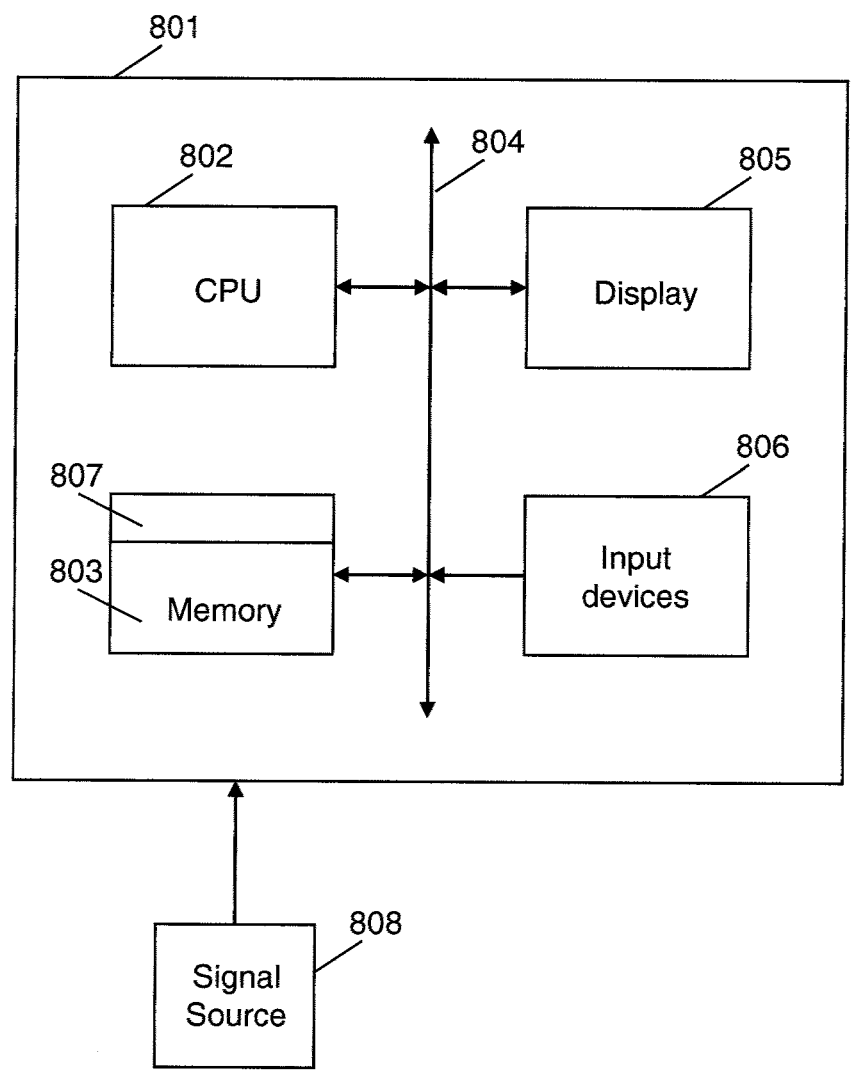
FIG. 8 illustrates a system in which an exemplary embodiment of the present invention may be implemented.

Referring now to FIG. 8, according to an exemplary embodiment of the present invention, a computer system 801 can comprise, inter alia, a central processing unit (CPU) 802, a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include RAM, ROM, disk drive, tape drive, etc., or a combination thereof. Exemplary embodiments of present invention may be implemented as a routine 807 stored in memory 803 (e.g., a non-transitory computer-readable storage medium) and executed by the CPU 802 to process the signal from a signal source 808. As such, the computer system 801 is a general-purpose computer system that becomes a specific purpose computer system when executing the routine 807 of the present invention.

The computer system 801 also includes an operating system and micro-instruction code. The various processes and functions described herein may either be part of the micro-instruction code or part of the application program (or a combination thereof) which is executed via the operating system. In addition, various other peripheral devices may be connected to the computer system 801 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
 receiving an image sequence, wherein the image sequence includes a plurality of two-dimensional (2D) image frames of an organ arranged in a time sequence;
 constructing a three-dimensional (3D) volume by stacking a plurality of the 2D image frames in time order;
 detecting a best bounding box for a target of interest in the 3D volume, wherein the best bounding box is specified by a plurality of parameters including spatial and temporal information contained in the 3D volume; and
 determining the target of interest from the best bounding box,
 wherein detecting a best bounding box for a target of interest comprises:
 (a) setting values for a nine-parameter set, wherein the nine-parameter set defines a box-like sub-volume in the 3D volume and the nine parameter set includes three positions, x,y,z, three orientations $\gamma,\phi,\psi$ and three scales sx,sy,sz, wherein the orientation parameters $\gamma,\phi,\psi$ reduce to $\gamma$ only,
 wherein $<x_{an},y_{an}>$ and $<x_{in},y_{in}>$ denote true positions of right ventricle (RV) insertion anterior and RV insertion inferior, respectively, time frame indices for a key-frame and a peak-frame of RV are expressed as $t_{RV}$ and $t_{pRV}$, respectively
 wherein a parameter set for RV insertion is:
 positions $\{(x_{an}+x_{in})/2,(y_{an}+y_{in})/2,t_{RV}\}$; orientations $\{\gamma$: orthogonal to a line segment connecting the RV insertion anterior and the RV insertion inferior, and pointing toward a left ventricle (LV), $\phi=0, \psi=0\}$; and scales $\{s_{ins}, s_{ins},(t_{pRV}-t_{RV})*\alpha\}$, where $s_{ins}=\sqrt{(x_{an}-x_{in})^2+(y_{an}-y_{in})^2}*\beta$ and $\alpha$ and $\beta$ are factors used to adjust range.

2. The method of claim 1, wherein the image sequence includes a perfusion magnetic resonance imaging (MRI) sequence.

3. The method of claim 2, wherein the organ includes a heart.

4. The method of claim 1, wherein the target of interest includes an LV center point, RV insertion points, an LV key-frame or an RV key-frame.

5. The method of claim 1, wherein detecting a best bounding box for a target of interest comprises:
 (b) extracting the sub-volume from the 3D volume;
 (c) applying the sub-volume to a pre-learned model for the target of interest; and
 (d) assigning a classification value to the sub-volume using the pre-learned model.

6. The method of claim 5, further comprising repeating a-d for a predetermined number of times, each time with at least one different value for the nine-parameter set, wherein the sub-volume with a highest classification value is the best bounding box.

7. The method of claim 5, wherein the pre-learned model uses a machine learning algorithm to automatically extract features to distinguish the target of interest from background.

8. The method of claim 1, wherein the target of interest is determined from the best bounding box by using a one-to-one mapping between the target of interest and the best bounding box.

9. A computer program product, comprising:
 a non-transitory computer readable storage medium having computer readable program code embodied therewith, the computer readable program code comprising:
 computer readable program code configured to perform the steps of:
 receiving an image sequence, wherein the image sequence includes a plurality of two-dimensional (2D) image frames of an organ arranged in a time sequence;
 constructing a three-dimensional (3D) volume by stacking a plurality of the 2D image frames in time order;
 detecting a best bounding box for a target of interest in the 3D volume, wherein the best bounding box is specified by a plurality of parameters including spatial and temporal information contained in the 3D volume; and
 determining the target of interest from the best bounding box,
 wherein detecting a best bounding box for a target of interest comprises:
 (a) setting values for a nine-parameter set, wherein the nine-parameter set defines a box-like sub-volume in the 3D volume and the nine parameter set includes three positions, x,y,z, three orientations $\gamma,\phi,\psi$ and three scales sx,sy,sz, wherein the orientation parameters $\gamma,\phi,\psi$ reduce to $\gamma$ only,
 wherein $<x_{an},y_{an}>$ and $<x_{in},y_{in}>$ denote true positions of right ventricle (RV) insertion anterior and RV insertion inferior, respectively, time frame indices for a key-frame and a peak-frame of RV are expressed as $t_{RV}$ and $t_{pRV}$, respectively
 wherein a parameter set for RV insertion is:
 positions $\{(x_{an}+x_{in})/2,(y_{an}+y_{in})/2,t_{RV}\}$; orientations $\{\gamma$: orthogonal to a line segment connecting the RV insertion anterior and the RV insertion inferior, and pointing toward a left ventricle (LV), $\phi=0, \psi=0\}$; and scales $\{s_{ins}, s_{ins},(t_{pRV}-t_{RV})*\alpha\}$, where $s_{ins}=\sqrt{(x_{an}-x_{in})^2+(y_{an}-y_{in})^2}*\beta$ and $\alpha$ and $\beta$ are factors used to adjust range.

10. The computer program product of claim 9, wherein the image sequence includes a perfusion magnetic resonance imaging (MRI) sequence.

11. The computer program product of claim 10, wherein the organ includes a heart.

12. The computer program product of claim 9, wherein the target of interest includes an LV center point, RV insertion points, an LV key-frame or an RV key-frame.

13. The computer program product of claim 9, wherein detecting a best bounding box for a target of interest comprises:
 (b) extracting the sub-volume from the 3D volume;
 (c) applying the sub-volume to a pre-learned model for the target of interest; and (d) assigning a classification value to the sub-volume using the pre-learned model.

14. The computer program product of claim 13, wherein the computer readable program code is further configured to perform the step of repeating a-d for a predetermined number of times, each time with at least one different value for the nine-parameter set, wherein the sub-volume with a highest classification value is the best bounding box.

15. The computer program product of claim 9, wherein the target of interest is determined from the best bounding box by using a one-to-one mapping between the target of interest and the best bounding box.

16. A method, comprising:
    receiving a cardiac perfusion magnetic resonance imaging (MRI) sequence, wherein the cardiac perfusion MRI sequence includes a plurality of two-dimensional (2D) image frames of a heart arranged in a time sequence;
    constructing a three-dimensional (3D) volume by stacking a plurality of the 2D image frames in time order;
    detecting a bounding box enclosing a landmark in the 3D volume, wherein the bounding box is specified by a plurality of parameters including spatial and temporal information contained in the 3D volume; and
    determining the landmark and its associated key-frame from the bounding box,
    wherein $<x_{an},y_{an}>$ and $<x_{in},y_{in}>$ denote true positions of right ventricle (RV) insertion anterior and RV insertion inferior, respectively, time frame indices for a key-frame and a peak-frame of RV are expressed as $t_{RV}$ and $t_{pRV}$, respectively
    wherein a parameter set for RV insertion is:
    positions $\{(x_{an}+x_{in})/2,(y_{an}+y_{in})/2,t_{RV}\}$; orientations $\{\gamma$: orthogonal to a line segment connecting the RV insertion anterior and the RV insertion inferior, and pointing toward a left ventricle (LV), $\phi=0, \psi=0\}$; and scales $\{s_{ins}, s_{ins},(t_{pRV}-t_{RV})*\alpha\}$, where $s_{ins}=\sqrt{(x_{an}-x_{in})^2+(y_{an}-y_{in})^2}*\beta$ and $\alpha$ and $\beta$ are factors used to adjust range.

17. The method of claim 16, wherein the landmark and its associated key-frame are determined simultaneously.

18. The method of claim 16, wherein the landmark includes a center part of the LV and the key-frame is a 2D image frame in which an upslope along a signal intensity curve for the LV reaches a maximum in the time sequence.

19. The method of claim 16, wherein the landmark includes RV insertion points and the key-frame is a 2D image frame in which an upslope along a signal intensity curve for the RV reaches a maximum in the time sequence.

20. The method of claim 19, wherein the RV insertion points include the RV anterior insertion point and the RV inferior insertion point.

* * * * *